United States Patent
Yi

(10) Patent No.: US 7,876,897 B2
(45) Date of Patent: Jan. 25, 2011

(54) DATA SECURITY IN WIRELESS NETWORK SYSTEM

(75) Inventor: Sang-Kug Yi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1095 days.

(21) Appl. No.: 11/327,347

(22) Filed: Jan. 9, 2006

(65) Prior Publication Data

US 2006/0153375 A1 Jul. 13, 2006

(30) Foreign Application Priority Data

Jan. 11, 2005 (KR) .................. 10-2005-0002649

(51) Int. Cl.
*H04L 9/00* (2006.01)
(52) U.S. Cl. .................. 380/44; 380/33; 380/270; 713/167; 713/193; 455/68; 455/435.1
(58) Field of Classification Search ............. 380/270, 380/44, 261; 455/68, 435.1
See application file for complete search history.

(56) References Cited

U.S. PATENT DOCUMENTS

| | | | | |
|---|---|---|---|---|
| 4,186,871 A | * | 2/1980 | Anderson et al. | 705/71 |
| 4,418,425 A | * | 11/1983 | Fennel et al. | 380/33 |
| 5,987,139 A | * | 11/1999 | Bodin | 380/44 |
| 6,359,986 B1 | * | 3/2002 | Tatebayashi | 380/277 |
| 7,336,783 B2 | * | 2/2008 | Park | 380/28 |
| 7,519,183 B2 | * | 4/2009 | Adachi et al. | 380/270 |
| 2004/0083362 A1 | * | 4/2004 | Park et al. | 713/162 |
| 2004/0131014 A1 | * | 7/2004 | Thompson et al. | 370/230 |
| 2004/0161105 A1 | * | 8/2004 | Park et al. | 380/28 |
| 2004/0196979 A1 | * | 10/2004 | Cheng et al. | 380/270 |
| 2004/0203591 A1 | * | 10/2004 | Lee | 455/410 |
| 2005/0025160 A1 | * | 2/2005 | Meier et al. | 370/395.53 |
| 2006/0126845 A1 | * | 6/2006 | Zheng | 380/270 |
| 2007/0081672 A1 | * | 4/2007 | Li et al. | 380/270 |
| 2008/0080713 A1 | * | 4/2008 | Cho et al. | 380/273 |

FOREIGN PATENT DOCUMENTS

WO 2004034634 4/2004

OTHER PUBLICATIONS

Office Action from Chinese Patent Office issued in Applicant's corresponding Chinese Patent Application No. 200610003620.6 dated Apr. 17, 2009.

* cited by examiner

*Primary Examiner*—Taghi T Arani
*Assistant Examiner*—Jason Lee
(74) *Attorney, Agent, or Firm*—H.C. Park & Associates, PLC

(57) ABSTRACT

For data protection in a wireless network system, a frame, including its Medium Address Control (MAC) header and payload, is encrypted with an initialization vector modified at each set state in a wireless network system, such that wirelessly transmitted data is prevented from being exposed to unauthorized users.

31 Claims, 3 Drawing Sheets

DATA SECURITY IN WIRELESS NETWORK SYSTEM

CLAIM OF PRIORITY

This application makes reference to, incorporates the same herein, and claims all benefits accruing under 35 U.S.C. §119 from an application for *APPARATUS AND METHOD FOR DATA SECURITY IN WIRELESS NETWORK SYSTEM*, earlier filed in the Korean Intellectual Property Office on 11 Jan. 2005 and there duly assigned Serial No. 2005-2649.

BACKGROUND OF THE INVENTION

1. Field of the Invention

The present invention relates to data security in a wireless network system, and more particularly, to an apparatus and method for data security in a wireless network system, which protect data by encrypting data frames to be transmitted, including their Medium Access Control (MAC) header and payload, with an Initialization Vector (IV) modified at each set state in the wireless network system.

2. Description of the Related Art

In general, stations, such as Personal Computers (PCs), Personal Digital Assistants (PDAs), notebook computers and the like, connect to a Local Area Network (LAN) and share several types of data or information with one another.

LAN systems can be classified into a wired LAN system and a Wireless LAN (WLAN) system depending on whether the movement of stations is allowed.

The wired LAN systems connect to one another and share information and resources via the cable at their fixed position. The use of the cable makes it inconvenient for users to move and requires a technical cabling task in moving the wired LAN systems. Furthermore, the maintenance of wired LAN systems consumes much time, obstructing tasks.

In the WLAN system, a communication between stations is performed via a wireless medium using a radio frequency or light. The WLAN systems have been developed with the advent of recent advanced Internet services and wireless communications technologies. The use of the WLAN system has proliferated because it is capable of being constructed for network connections between buildings and at places such as large-scale offices or physical-distribution centers where a wired network is difficult to construct, and provides facilitated maintenance.

The WLAN system is composed of Access Points (APs) and stations. The AP sends radio frequencies to enable WLAN users within its coverage area to unitize Internet connections and networks, and acts as a base station of cellular telephones or a hub of a wired network. For high-speed wireless Internet services provided by Internet Service Providers (ISPs), APs are disposed within a service area.

Stations are required to have a WLAN card to perform wireless network communications. Stations can be Personal Computers (PCs including notebook computers) and PDAs.

Recently, a WLAN standard, widely used, is IEEE 802.11 that conforms to "Standard for Information technology-Telecommunications and information exchange between systems-Local and metropolitan area networks-Specific requirements-Parts? Wireless LAN Medium Access Control (MAC) and Physical Layer (PHY) Specifications" 1999 Edition.

In the IEEE 802.11 standard, a basic construction block for a network is a Basic Service Set (BSS). An IEEE 802.11 network includes an independent BSS in which stations in BSS perform direct communication there between, an infrastructure BSS in which a station in BSS communicates with a station inside or outside the BSS via an AP, and an extended service set that extends a service area through a connection between BSS and BSS.

The WLAN system has several shortcomings associated with security because of its characteristics of using radio frequencies for communications.

First, unauthorized users are allowed to easily access network resources. A physical approach to a network is necessary to access a wired LAN system and utilize network resources. For example, to utilize a wired LAN system, one has to enter an office or a building where the wired LAN system is constructed, making it difficult for unauthorized users to utilize network resources. However, in WLAN systems, accessing the network resources requires only that radio frequencies emitted from a user's station arrives at an AP. The radio frequencies penetrate walls, ceilings, and bottoms and thus unauthorized users are actually allowed to employ network resources without being discovered. Consequently, this introduces an authentication mechanism into the WLAN system so that only authorized users employ network resources.

In a wired LAN system environment, data transmitted from a sending station to a receiving station is less discovered by unauthorized users because the data is conveyed over a determined medium. In a WLAN system environment, data is conveyed on radio frequencies and thus there is a risk that the data is exposed to unauthorized users in places at which the radio frequencies arrive. Accordingly, there is a need, in the WLAN system environment, for a mechanism that encrypts data so as not to be exposed to unauthorized users.

To provide security for a WLAN system, access control and data confidentiality are supported. The access control is performed through user authentication by the following methods: a method in which authorized users and an AP have the same share key that is used for authentication upon an access request, a method in which a MAC address of a WLAN card mounted on an authorized user's station is directly input to the AP, and an IEEE 802.11x authentication method in which users perform an authentication procedure with respect to an authentication server by use of his or her authentication information.

Data confidentiality is supported using a Wired Equivalent Privacy (WEP) algorithm in which a key length used is 40 or 104 bits.

Furthermore, the IEEE 802.11i standard prescribes IEEE 802.1x/1aa based access control, security session management, dynamic key exchange and management, and a new symmetric key encryption algorithm applied to provide data protection in wireless sections in order to address shortcomings of an IEEE 802.11 WLAN system associated with security in the wireless sections. In other words, the IEEE 802.11x/1aa standard prescribes a framework of user authentication and key exchange while the IEEE 802.11i standard prescribes the use of IEEE 802.1x/1aa as a great framework of the user authentication and the key exchange. Moreover, the IEEE 802.11i defines a 4-way handshake scheme as a key exchange scheme, a hierarchy of an exchanged key, and cipher suites for new wireless sections.

In the security algorithm, keys are used to encrypt/decrypt data. The keys for data encryption/decryption are imparted using a Pre-Shared Key (PSK) scheme and through an authentication server, as prescribed in the IEEE 802.1x standard.

There are two types of keys that are imparted to stations and APs: a pair-wise key intended to distinguish between the stations and the APs and a group key that is broadcast to be shared between the APs and the stations within the service area of the APs.

The thus imparted keys or a combination of the keys and an IV are used to encrypt or decrypt data between a station and an AP or between a station and a station. The use of an IV allows dynamic data encryption.

The encryption with the key shared between the station and the AP and between the station and the station or with a combination of the shared key and an IV is performed only on a payload of a frame as a data transfer unit and not an MAC header portion, which contains information about the stations and the network. In other words, an IV, which is contained in the MAC header portion of the frame used to transfer data, is not encrypted but transferred in the form of a plain text. This exposes any information contained in an IV to stations within the service area of the AP, increasing a risk of information hacking.

To address this problem, encryption has been attempted even below a data link layer. In other words, efforts have been done to increase frame invisibility by encrypting even the MAC header of the frame. This will be referred to as physical layer encryption. However, the physical layer encryption uses only a fixed key sequence instead of an IV. If any stations located within the service area of the AP are aware of the fixed key sequence, transmitted frames would be exposed to hacking, degrading the effectiveness of security.

SUMMARY OF THE INVENTION

Accordingly, it is an object of the present invention to provide an apparatus and method for data security in a wireless network system, which are capable of performing dynamic encryption by modifying an Initialization Vector (IV) value at each set state while applying physical layer encryption, thereby protecting data from hacking.

According to one aspect of the present invention, an apparatus for data security in a wireless network system is provided, the apparatus comprising: a modifier adapted to modify encryption/decryption key information for encrypting a frame to be transmitted to a wireless network based on modification status information for the encryption/decryption key information; an encryptor adapted to encrypt the frame with the modified encryption/decryption key information according to a predetermined encryption algorithm upon a subsequent receipt of a request to transmit the frame; and a transmitter adapted to transmit the encrypted frame to the wireless network.

The modification status information preferably comprises either information as to a set time or information as to a number of times that frames to be transmitted to the wireless network have been generated.

The encryption/decryption key information preferably comprises one of information as to a group key set to be shared between one unit and at least another unit to protect the frame transmitted to the wireless network, information as to a pair-wise key set in each unit and the at least another unit, information as to a combination of information as to an initialization vector that the unit generates using a random number generation function and the group key information, and information as to a combination of the initialization vector information and the pair-wise key information set in each unit and the at least another unit.

The modifier is preferably adapted to modify the initialization vector information in response to the modification status information for the encryption/decryption key information indicating modification.

The apparatus preferably further comprises a storage unit adapted to store one of the encryption/decryption key information, initialization vector information, and the modification status information for the encryption/decryption key.

The initialization vector information preferably comprises one of initialization vector information generated upon a first frame being transmitted to the wireless network, and initialization vector information that is modified upon the modification status information for the encryption/decryption key indicating modification.

The apparatus preferably further comprises an initialization vector generator adapted to generate an initialization vector created by a random number generation function and to transfer it into a first frame upon the first frame being transmitted to the wireless network, and the encryptor adapted to encrypt the frame with the encryption/decryption key information according to the encryption algorithm, and the initialization vector generator adapted to generate an initialization vector, modified upon the modification status information for the encryption/decryption key indicating modification, and to transfer it into the frame and the encryptor adapted to encrypt the frame with a non-modified initialization vector information and the encryption/decryption key information according to the encryption algorithm.

The encryption algorithm preferably comprises either a Wired Equivalent Privacy (WEP) algorithm or a Counter-mode CBC MAC Protocol (CCMP) algorithm.

The apparatus preferably further comprises a decryptor adapted to decrypt the received frame from the wireless network with the encryption/decryption key information, to determine whether or not the initialization vector information is contained in the decrypted frame, and to store the initialization vector information contained in the decrypted frame in a storage unit.

After storing the initialization vector information in the storage unit, the decryptor is preferably adapted to decrypt the received frame from the wireless network with the encryption/decryption key information and the stored initialization vector information in the storage unit, to determine whether or not initialization vector information different from the stored initialization vector information in the storage unit is contained in the decrypted frame, and to store the different initialization vector information contained in the decrypted frame in the storage unit.

The decryptor is preferably adapted to decrypt a received frame from the wireless network with the encryption/decryption key information and the different initialization vector information after storing the different initialization vector information in the storage unit.

According to another aspect of the present invention, an apparatus for data security in a wireless network system is provided, the apparatus comprising: a modifier adapted to modify encryption/decryption key information for encrypting a frame to be transmitted to a wireless network based on modification status information for the encryption/decryption key information; an encryptor adapted to selectively encrypt a Medium Access Control (MAC) header portion and a payload portion of the frame with the modified encryption/decryption key information according to a predetermined encryption algorithm upon a subsequent receipt of a request to transmit the frame; and a transmitter adapted to transmit the encrypted frame to the wireless network.

The modification status information preferably comprises either information as to a set time or information as to a number of times that frames to be transmitted to the wireless network have been generated.

The encryption/decryption key information preferably comprises one of information as to a group key set to be shared between one unit and at least another unit to protect the frame transmitted to the wireless network, information as to a pair-wise key set in each unit and the at least another unit, information as to a combination of information as to an initialization vector that the unit generates using a random number generation function and the group key information, and information as to a combination of the initialization vector information and the pair-wise key information set in each unit and the at least another unit.

The modifier is preferably adapted to modify the initialization vector information in response to the modification status information for the encryption/decryption key information indicating modification.

The apparatus preferably further comprises an initialization vector generator adapted to generate an initialization vector created by a random number generation function and to transfer it into a first frame upon the first frame being transmitted to the wireless network, and the encryptor adapted to selectively encrypt a MAC header portion and a payload portion of the first frame with the encryption/decryption key information according to the encryption algorithm, and the initialization vector generator adapted to generate an initialization vector, modified upon the modification status information for the encryption/decryption key indicating modification, and to transfer it into the frame and the encryptor adapted to selectively encrypt a MAC header portion and a payload portion of the frame with a non-modified initialization vector information and the encryption/decryption key information according to the encryption algorithm.

The apparatus preferably further comprises a decryptor adapted to selectively decrypt a MAC header portion and a payload portion of the received frame from the wireless network with the encryption/decryption key information, to determine whether or not the initialization vector information is contained in the decrypted frame, and to store the initialization vector information contained in the decrypted frame in a storage unit.

The decryptor is preferably adapted to selectively decrypt a MAC header portion and a payload portion of the received frame from the wireless network with the encryption/decryption key information and the stored initialization vector information in the storage unit, to determine whether or not initialization vector information different from the stored initialization vector information in the storage unit is contained in the decrypted frame, and to store the different initialization vector information contained in the decrypted frame in the storage unit.

The decryptor is preferably adapted to selectively decrypt a MAC header portion and a payload portion of a received frame from the wireless network with the encryption/decryption key information and the different initialization vector information after storing the different initialization vector information in the storage unit.

According to yet another aspect of the present invention, a data security method in a unit of a wireless network system is provided, the method comprising: modifying encryption/decryption key information to encrypt a frame to be transmitted to a wireless network, based on modification status information for the encryption/decryption key information; and encrypting the frame with the modified encryption/decryption key information according to a predetermined encryption algorithm upon subsequent receipt of a request to transmit the frame, and transmitting the encrypted frame to the wireless network.

The modification status information preferably comprises either information as to a set time or information as to a number of times that frames to be transmitted to the wireless network have been generated.

The encryption/decryption key information preferably comprises one of information as to a group key set to be shared between the unit and at least another unit to protect the frame transmitted to the wireless network, information as to a pair-wise key set in each unit and the at least another unit, information as to a combination of information as to an initialization vector that the unit generates using a random number generation function and the group key information, and information as to a combination of the initialization vector information and the pair-wise key information set in each unit and the at least another unit.

The initialization vector information is preferably modified in response to the modification status information for the encryption/decryption key information indicating modification.

Encrypting the frame preferably comprises: including an initialization vector created by a random number generation function in a first frame upon the first frame being transmitted to the wireless network, and encrypting the frame with the encryption/decryption key information according to the encryption algorithm; and including an initialization vector, modified upon the modification status information for the encryption/decryption key indicating modification, in the frame and encrypting the frame with a non-modified initialization vector information and the encryption/decryption key information according to the encryption algorithm.

The encryption algorithm preferably comprises either a Wired Equivalent Privacy (WEP) algorithm or a Counter-mode CBC MAC Protocol (CCMP) algorithm.

The method preferably further comprises: decrypting the received frame from the wireless network with the encryption/decryption key information, determining whether or not the initialization vector information is contained in the decrypted frame, and storing the initialization vector information contained in the decrypted frame in a database.

The method preferably further comprises: after storing the initialization vector information in the database, decrypting the received frame from the wireless network with the encryption/decryption key information and the stored initialization vector information in the database; and determining whether or not initialization vector information different from the stored initialization vector information in the storage unit is contained in the decrypted frame, and storing the different initialization vector information contained in the decrypted frame in the database.

The method preferably further comprising: decrypting a received frame from the wireless network with the encryption/decryption key information and the different initialization vector information after storing the different initialization vector information in the storage unit.

According to still another aspect of the present invention, a data security method in a unit of a wireless network system is provided, the method comprising: modifying encryption/decryption key information for encrypting a frame to be transmitted to a wireless network, based on modification status information for the encryption/decryption key information; selectively encrypting a Medium Access Control (MAC) header portion and a payload portion of the frame with the modified encryption/decryption key information according to a predetermined encryption algorithm upon subsequent receipt of a request to transmit the frame, and transmitting the encrypted frame to the wireless network.

The modification status information preferably comprises either information as to a set time or information as to a number of times that frames to be transmitted to the wireless network have been generated.

The encryption/decryption key information preferably comprises one of information as to a group key set to be shared between the unit and at least another unit to protect the frame transmitted over the wireless network, information as to a pair-wise key set in each unit and the at least another unit, information as to a combination of information as to an initialization vector that the unit generates using a random number generation function and the group key information, and information as to a combination of the initialization vector information and the pair-wise key information set in each unit and the at least another unit.

The initialization vector information is preferably modified in response to the modification status information for the encryption/decryption key information indicating modification.

Encrypting the frame preferably comprises: including an initialization vector created by a random number generation function in a first frame upon the first frame being transmitted to the wireless network, and selectively encrypting a Medium Access Control (MAC) header portion and a payload portion of the frame with the encryption/decryption key information according to the encryption algorithm; and including an initialization vector, modified upon the modification status information for the encryption/decryption key indicating modification, in the frame and selectively encrypting an MAC header portion and a payload portion of the frame with a non-modified initialization vector information and the encryption/decryption key information according to the encryption algorithm.

The method preferably further comprises: selectively decrypting a MAC header portion and a payload portion of the received frame from the wireless network with the encryption/decryption key information, determining whether or not the initialization vector information is contained in the decrypted frame, and storing the initialization vector information contained in the decrypted frame in the database.

The method preferably further comprises: after storing the initialization vector information in the database, selectively decrypting a MAC header portion and a payload portion of the received frame from the wireless network with the encryption/decryption key information and the stored initialization vector information in the database; and determining whether or not initialization vector information different from the stored initialization vector information in the database is contained in the decrypted frame, and storing the different initialization vector information contained in the decrypted frame in the database.

The method preferably further comprises: selectively decrypting a MAC header portion and a payload portion of a received frame from the wireless network with the encryption/decryption key information and the different initialization vector information after storing the different initialization vector information in the database.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings, in which like reference symbols indicate the same or similar components, wherein.

DETAILED DESCRIPTION OF THE INVENTION

Hereinafter, an apparatus and method for data security in a wireless network system according to the present invention will be described in detail with reference to the accompanying drawings.

Figure 1:
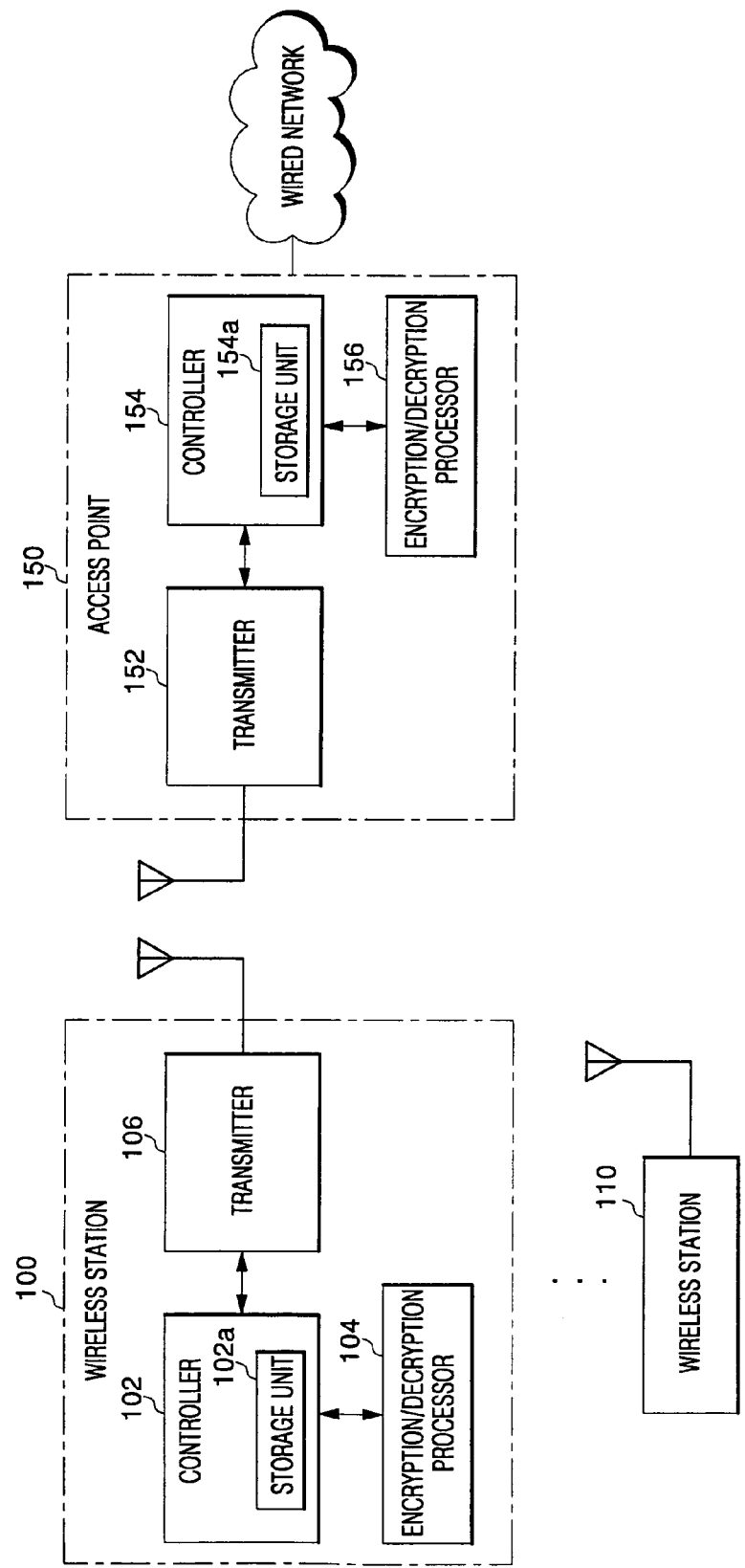
FIG. 1 is a block diagram of an embodiment of a wireless network system according to the present invention.

FIG. 1 is a block diagram of an embodiment of a wireless network system according to the present invention.

As shown in FIG. 1, a wireless network system according to the present invention is a WLAN system that includes one or more wireless stations 100 and 110 and an AP 150. That is, the wireless stations 100 and 110 are located within a service area of the AP 150, which constitutes the WLAN system. The AP 150 can connect to a wired network to perform communication with external networks.

Since the wireless stations 100 and 110 have the same configuration, the description will be given in connection with only the configuration of the wireless station 100. It is assumed that the wireless station 100, the wireless station 110 and the AP 150 have the same set key for data encryption/decryption. The data encryption/decryption key can be imparted by a PSK based scheme and through an authentication server-based setting method, as prescribed in IEEE 802.11x. The data encryption/decryption key includes a pair-wise key intended to discriminate between stations and APs, and a group key that is broadcast to be shared between APs and wireless stations located within service areas of the APs. In other words, the wireless station 100, the wireless station 110, and the AP 150 have their own unique pair-wise key and a group key shared among them, which are set for data encryption/decryption. It is assumed that the keys are set in a controller of each of the wireless station 100, the wireless station 110 and the AP 150.

Data transmission in the service area of the AP 150 can be made from the AP 150 to the respective wireless stations 100 and 110, from the wireless station 100 to the wireless station 110 and the AP 150, or from the wireless station 110 to the wireless station 100 and the AP 150.

Hereinafter, the present invention will be described by way of example in connection with a case where data transmission in the service area of the AP 150 is made from the wireless station 110 to the AP 150.

When the data encryption/decryption keys are set, a controller 102 of the wireless station 100 creates an IV through a random number generation function and stores the IV in a storage unit 102a.

Upon receipt of a request to transmit data to the AP 150, the controller 102 transfers the data into a payload and the IV stored in the storage unit 102a into a MAC header to generate a frame. The controller 102 provides the generated frame to an encryption/decryption processor 104. The MAC header can include an IV that is set in the wireless station 100, a sending MAC address that is a physical address of the wireless station 100, and a receiving MAC address that is a physical address of the AP 150. When the encryption/decryption keys are set, each unique IV is set in the wireless stations 100 and 110 and the AP 150, and first and second tables are created which respectively include pair-wise key information corresponding to the unique IV and pair-wise key information corresponding to the MAC address. They are shared between the wireless station 100, the wireless station 110 and the AP 150.

The encryption/decryption processor 104 encrypts the entire received frame from the controller 102 with the set keys according to a predetermined encryption algorithm. The encryption algorithm for encrypting the entire frame with the set keys can be a WEP algorithm or a Counter-mode CBC MAC Protocol (CCMP) algorithm.

The encryption of the entire frame performed by the encryption/decryption processor 104 with the set keys according to the predetermined encryption algorithm will be described in more detail. The set keys can be the group key and/or the pair-wise key.

Frame encryption includes encryption with only the group key and encryption with both the group key and the pair-wise key.

First, in the encryption with only the group key, the encryption/decryption processor 104 encrypts the entire frame (including a MAC header and a payload) with the set group key according to the predetermined encryption algorithm.

Next, in the encryption with both the group key and the pair-wise key, the encryption/decryption processor 104 can encrypt the MAC header portion in the frame with the group key and encrypt the payload portion in the frame with the pair-wise key. Preferably, the encryption pair-wise key is one imparted to the wireless station 100.

The controller 102 then sends the encrypted frame from the encryption/decryption processor 104 to the AP 150 via the transmitter 106.

A controller 154 in the AP 150 provides the frame received by the transmitter 152 and the set encryption/decryption key to an encryption/decryption processor 156.

The encryption/decryption processor 156 decrypts the received frame from the wireless station 100 with the set encryption/decryption key.

More specifically, the encryption/decryption processor 156 decrypts the entire received encrypted frame from the wireless station 100 with the group key. When the entire encrypted frame is decrypted, the encryption/decryption processor 156 then provides the decrypted frame to the controller 154. The controller 154 stores the IV, contained in the decrypted frame, in the storage unit 154a and processes the data contained in the frame payload.

When the entire encrypted frame is not decrypted with the set group key, the encryption/decryption processor 156 decrypts the MAC header portion of the frame with the group key to obtain a MAC address and an IV that are contained in the MAC header. On the contrary, if the IV and the unique IV imparted to the wireless station 100 are contained in the header of the encrypted frame, the encryption/decryption processor 156 decrypts the MAC header portion of the frame with the group key to obtain the IV and the unique IV set in the wireless station 100 that are contained in the MAC header. The encryption/decryption processor 156 provides the MAC address and IV or IV and the unique IV of the wireless station 100, which are obtained by decrypting the frame MAC header, to the controller 154.

The controller 154 stores the received IV from the encryption/decryption processor 156 in the storage unit 154a, reads out the pair-wise key information corresponding to the unique IV of the wireless station 100 or the MAC address from the first or second table stored in the storage unit 154a, and then, provides it to the encryption/decryption processor 156. The MAC address can be either the MAC address of the wireless station 100 or the MAC address of the AP 150. Preferably, the MAC address is a sending MAC address, i.e., the MAC address of the wireless station 100.

Accordingly, the controller 154 reads out the pair-wise key corresponding to the unique IV of the wireless station 100 or the pair-wise key corresponding to the MAC address of the wireless station 100 from the storage unit 154a and provides them to the encryption/decryption processor 156.

The encryption/decryption processor 156 decrypts the payload of the received frame from the wireless station 100 with the pair-wise key from the controller 154, and provides the decrypted payload to the controller 154.

The controller 154 processes data that corresponds to the received decrypted payload from the encryption/decryption processor 156.

As described above, when data transmission is made from the wireless station 100 to the AP 150, the wireless station 100 encrypts the frame with only the initially set group key or both the group key and the pair-wise key, and sends the encrypted frame to the AP 150, and the AP 150 decrypts the encrypted frame from the wireless station 100 with only the initially set group key or both the group key and the pair-wise key.

However, there is a risk that the initially set keys would be exposed when they continue to be used in the encryption/decryption, requiring modification of the encryption/decryption keys. Accordingly, the IV should be modified to avoid the exposure upon the encryption/decryption since the frame encryption/decryption has been performed with an IV created prior to frame encryption/decryption (that is, a non-modified IV) and the encryption/decryption key according to a predetermined encryption/decryption algorithm.

To this end, a user is allowed to set a key modification period used to modify the encryption/decryption key. Setting the key modification period can be performed when the encryption/decryption key is set. The thus set key modification period can be stored in the respective storage units of the wireless stations 100 and 110 and the AP. The key modification period can be set corresponding to an IV modification period. The IV modification period can be set by either a time or a number of frames to be transmitted, but it is to be noted that situations according to the present invention allows the IV modification period to be set differently.

The encryption/decryption of frames between the wireless station 100 and the AP 150 when the key modification period arrives is described in more detail as follows.

The controller 102 in the wireless station 100 determines whether or not the key modification period has arrived. When the key modification period has arrived, the controller 102 generates a new IV (that is, a modified IV) using a random number generation function and stores the new IV in the storage unit 102a.

Upon receipt of a request to transmit data to the AP 150, the controller 102 transfers the data into a payload and the IV stored in the storage unit 102a into a MAC header to create a frame, and provides the created frame to the encryption/decryption processor 104. The MAC header can include a unique IV for the wireless station, a sending MAC address that is a physical address of the wireless station, and a receiving MAC address that is a physical address of the AP.

The encryption/decryption processor 104 encrypts the entire received frame from the controller 102 with the set keys and the non-modified IV according to a predetermined encryption algorithm. The encryption algorithm for encrypting the entire frame with the set keys and the non-modified IV can be a WEP algorithm or a CCMP algorithm.

The encryption of the entire frame performed by the encryption/decryption processor 104 with the set keys and the non-modified IV according to the predetermined encryption algorithm is described below in more detail. The set keys can be the group key and/or the pair-wise key.

Frame encryption includes encryption with only the group key and the non-modified IV, and encryption with the group key, the pair-wise key and the non-modified IV.

First, in the encryption with only the group key and the non-modified IV, the encryption/decryption processor 104 encrypts the entire frame (including a MAC header and a payload) with the set group key and the non-modified IV according to the predetermined encryption algorithm.

Next, in the encryption with the group key, the pair-wise key and the non-modified IV, the encryption/decryption processor 104 can perform the frame encryption using the following methods.

First, the MAC header portion of the frame can be encrypted with the group key and the non-modified IV, and the payload portion of the frame can be encrypted with the pair-wise key and the non-modified IV. Second, the MAC header portion of the frame can be encrypted with the group key and the non-modified IV, and the payload portion of the frame can be encrypted only with the pair-wise key. Third, the MAC header portion of the frame can be encrypted only with the group key, and the payload portion of the frame can be encrypted with the pair-wise key and the non-modified IV. Hereinafter, it is assumed that the frame encryption in the encryption/decryption processor 104 is performed by the second method.

The controller 102 then sends the encrypted frame from the encryption/decryption processor 104 to the AP 150 via the transmitter 106.

The controller 154 in the AP 150 provides the frame received by the transmitter 152 and the set encryption/decryption key and the non-modified IV to the encryption/decryption processor 156.

The encryption/decryption processor 156 decrypts the received frame from the wireless station 100 with the set encryption/decryption key and the non-modified IV.

More specifically, the encryption/decryption processor 156 decrypts the received encrypted frame from the wireless station 100 with the group key and the non-modified IV. If the entire encrypted frame is decrypted, the encryption/decryption processor 156 provides the decrypted frame to the controller 154. The controller 154 stores a modified IV contained in the decrypted frame into the storage unit 154a and processes data contained in the frame payload.

When the entire encrypted frame is not decrypted with the set group key and the non-modified IV, the encryption/decryption processor 156 decrypts the MAC header portion of the frame with the group key and the non-modified IV to obtain the MAC address, the modified IV and the unique IV of the wireless terminal 100 that are contained in the MAC header. The encryption/decryption processor 156 provides the MAC address, the modified IV and the unique IV of the wireless terminal 100, which are obtained by decrypting the frame MAC header, to the controller 154.

The controller 154 stores the received modified IV from the encryption/decryption processor 156 in the storage unit 154a, reads out the pair-wise key information corresponding to the unique IV of the wireless station 100 or the MAC address from the storage unit 152a, and then, provides it to the encryption/decryption processor 156. The MAC address can be either the MAC address of the wireless station 100 or the MAC address of the AP 150. Preferably, the MAC address is a sending MAC address, i.e., the MAC address of the wireless station 100.

Accordingly, the controller 154 reads out the pair-wise key corresponding to the unique IV of the wireless station 100 or the pair-wise key corresponding to the MAC address of the AP 150 from the storage unit 154a and provides it to the encryption/decryption processor 156.

The encryption/decryption processor 156 decrypts the payload of the received frame from the wireless station 100 with the pair-wise key from the controller 154, and provides the decrypted payload to the controller 154.

The controller 154 processes data that corresponds to the received decrypted payload from the encryption/decryption processor 156.

The above-described encryption/decryption is associated with the MAC header and the payload of the frame. The encrypted frame or the non-encrypted frame (i.e., a frame created at a data link layer) is subject to a procedure converging on a physical layer prior to wireless transmission. To this end, a Physical Layer Convergence Procedure (PLCP) frame is added to the frame created at the data link layer. The PLCP is an interface between a MAC that controls access to a medium shared among several wireless stations and a Physical Medium Dependent (PMD) responsible for modulation, and data transmission and reception among several wireless stations, including a MODEM and an RF stage.

The PLCP frame is configured of a PLCP preamble and a PLCP header. The PLCP preamble is used to synchronize between the sending side and the receiving side and trigger common timing. In IEEE 802.11, a training sequence is prescribed to synchronize between the sending side and the receiving side. That is, the sending side and the receiving side are allowed to communicate with each other when the training sequences match.

The PLCP header is followed by the PLCP preamble and includes length information of a frame (MAC frame) following the PLCP frame, information about a transfer speed of a frame (MAC frame), and a frame check sequence for PLCP header error prevention.

The training sequence contained in the PLCP preamble is fixed. It is possible to protect wirelessly transmitted data by changing the training sequence.

Figure 2:
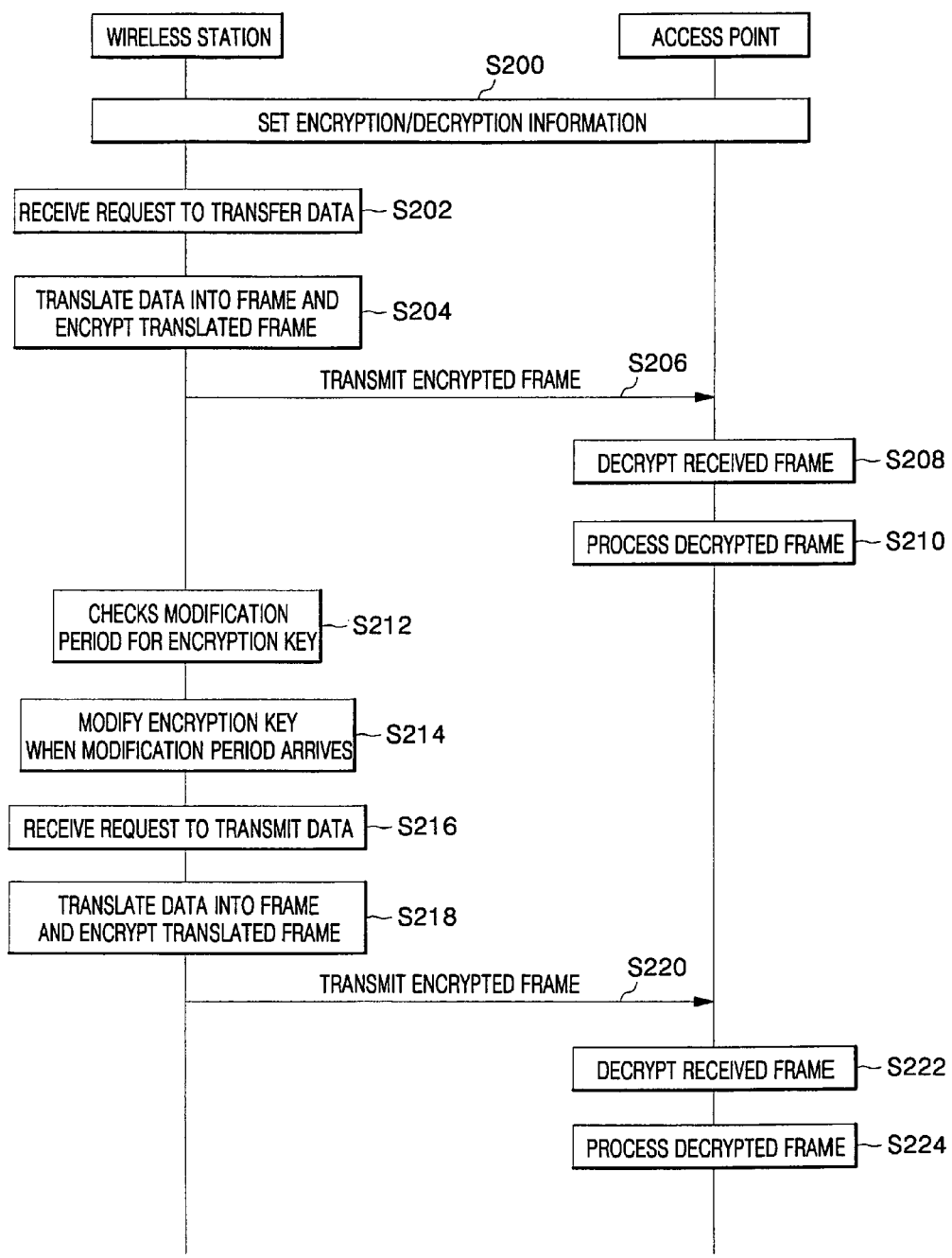
FIG. 2 is a view of a data security method for a wireless network system according to an embodiment of the present invention.

FIG. 2 is a view of a data security method for a wireless network system according to an embodiment of the present invention.

It is assumed that the wireless station is a sending side and the AP is a receiving side.

Encryption/decryption information is set to provide security for data wirelessly transmitted between the wireless station and the AP (S200).

The encryption/decryption information includes key information used for data encryption/decryption, a table that includes the pair-wise key set in the wireless stations and the AP corresponding to the respective MAC addresses of the wireless stations and the AP, and a table that includes the pair-wise key set in the wireless stations and the AP corresponding to the unique initialization vector (IV) set in each of the wireless stations and the AP. The key used for the data encryption/decryption can include a group key shared between the wireless station and the AP and a pair-wise key set in each of the wireless station and the AP. This key can be imparted by a PSK based scheme and an authentication server based setting scheme, as prescribed in IEEE 802.11x.

Figure 3:
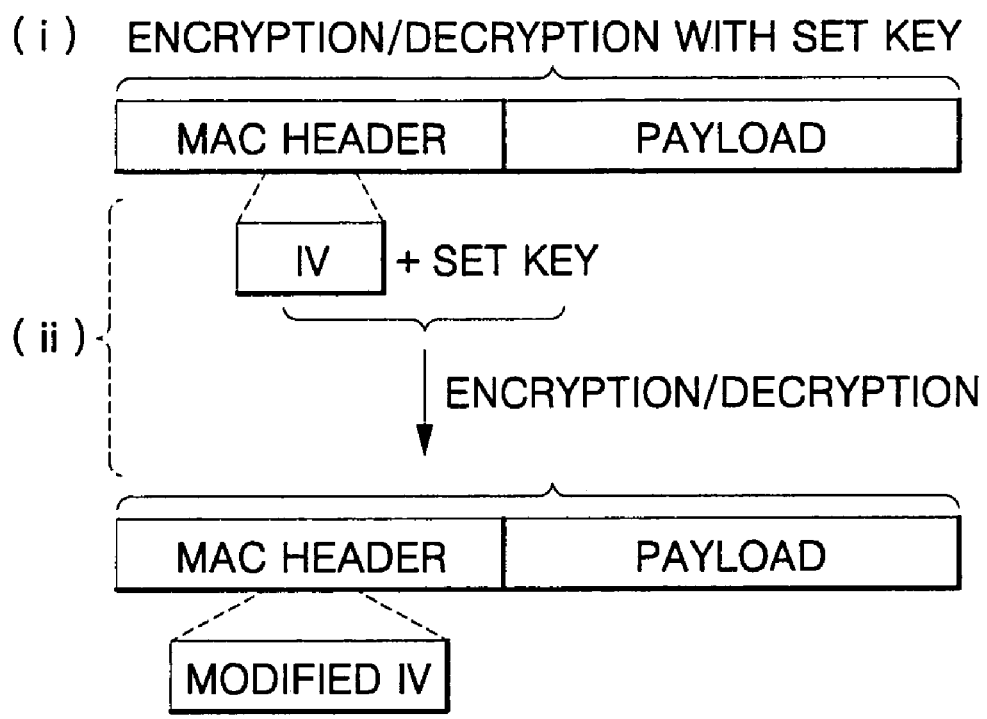
FIG. 3 is a view of a frame that is generated according to an embodiment of the present invention.

Upon receipt of a request to transfer data (S202), the wireless station transfers the data into a payload and includes the MAC address of the wireless station, the MAC address of the AP, the unique IV set in the wireless stations or the AP, and IV created through the random number generation function into the MAC header to create a frame. The wireless station then encrypts the created frame S202 with the set key (S204). This is illustrated in (i) of FIG. 3. The set key refers to the group key shared between the wireless station and the AP and the pair-wise key set in each of the wireless station and the AP.

The frame encryption can be done with the group key and the IV, and encryption with the group key, the pair-wise key, and the IV. The IV used for frame encryption may be one of the unique IV set in the wireless stations or the AP, and the IV created through the random number generation function.

First, an entire frame (including the MAC header and the payload) can be encrypted with the set group key and IV according to a predetermined encryption algorithm.

A case will be described in which the encryption is performed with the group key, the pair-wise key, and the IV.

First, the MAC header portion is encrypted with the group key and the IV, and the payload of the frame portion is encrypted with the pair-wise key and the IV.

Second, the MAC header portion can be encrypted with the group key and the IV, and the payload portion of the frame can be encrypted with only the pair-wise key.

Third, the MAC header portion can be encrypted with only the group key, and the payload portion of the frame can be encrypted with the pair-wise key and the IV. Hereinafter, it is assumed that the frame encryption uses the second method.

The wireless station transmits the encrypted frame to the AP (S206), and the AP decrypts the encrypted frame with the set group key (S208). This corresponds to (i) shown in FIG. 3.

First, the AP decrypts the received encrypted frame with the group key. After the encrypted frame is decrypted, the AP stores the IV included in the decrypted frame in the database and processes data included in the payload of the frame. On the other hand, when the entire encrypted frame is not decrypted with the set group key, the AP decrypts the MAC header portion of the frame with the group key to obtain the MAC address, IV and the unique IV of the wireless station.

The AP stores the obtained IV in its own database, and reads out the pair-wise key corresponding to the unique IV of the wireless station or the pair-wise key corresponding to the MAC address of the wireless station from the table that includes the pair-wise key information corresponding to the unique IV already stored in the database or the table that includes the pair-wise key information corresponding to the MAC address. The AP decrypts the payload of the received frame from the wireless station with the read pair-wise key and processes data corresponding to the decrypted payload (S210).

The wireless station then determines whether or not a modification period to modify the set encryption key has arrived (S212), and when the modification period has arrived, modifies the set encryption key according to set encryption modification information (S214). Setting the key modification period is performed upon setting the encryption/decryption information, and the key modification period can be set by either time or a number of transmitted frames. The encryption modification information is used to generate a new IV (that is, a modified IV) through a random number generation function and to perform data encryption by combining a non-modified IV and the set key when the key modification period arrives.

In other words, in S214, when the key modification period occurs, the set encryption key is modified into a combination of the non-modified IV and the set key according to the set encryption modification information. The new IV (modified IV) is created through a random number generation function and stored in the database of the wireless station.

When the wireless station receives a request to transmit data to the AP (S216), the wireless station transfers the data into a payload and transfers the modified IV, MAC address, and the unique IV of the wireless station into the MAC header to create a frame. The wireless station encrypts the frame with the non-modified IV and the set key according to a predetermined encryption algorithm (S218). This is shown in (ii) of FIG. 3. The MAC header can include a unique IV for the wireless station, a sending MAC address that is a physical address of the wireless station, and a receiving MAC address that is a physical address of the AP. The encryption algorithm for encrypting frames with set keys and a non-modified IV can be a WEP algorithm or a CCMP algorithm.

The frame encryption with the set keys and the non-modified IV according to a predetermined encryption algorithm is described below in more detail. The set keys can be the group key and the pair-wise key or the pair-wise key.

Frame encryption includes encryption with only the group key and the non-modified IV, and encryption with the group key, the pair-wise key and the non-modified IV.

First, in the encryption with only the group key and the non-modified IV, the encryption/decryption processor 104 encrypts the entire frame (including the MAC header and the payload) with the set group key and the non-modified IV according to the predetermined encryption algorithm.

Next, in the encryption with the group key, the pair-wise key and the non-modified IV, the encryption/decryption processor 104 can perform the frame encryption using the following methods.

First, the MAC header portion of the frame can be encrypted with the group key and the non-modified IV, and the payload portion of the frame can be encrypted with the pair-wise key and the non-modified IV. Second, the MAC header portion of the frame can be encrypted with the group key and the non-modified IV, and the payload portion of the frame can be encrypted only with the pair-wise key. Third, the MAC header portion of the frame can be encrypted only with the group key, and the payload portion of the frame can be encrypted with the pair-wise key and the non-modified IV. Hereinafter, it is assumed that the frame encryption in the wireless station is performed by the second method.

The wireless station then transmits the encrypted frame to the AP (S220).

The AP decrypts the received frame from the wireless station with a set encryption/decryption key and the non-modified IV stored in the database.

Specifically, the AP decrypts the received encrypted frame from the wireless station with the group key and the non-modified IV (S222). When the entire encrypted frame is decrypted, the AP stores the modified IV, which is contained in the decrypted frame, in the database and processes data that is contained in the payload of the frame.

On the other hand, when the entire encrypted frame is not decrypted with the set group key and the non-modified IV, the AP decrypts the MAC header portion of the frame with the group key and the non-modified IV to obtain the MAC address and the modified IV that are contained in the MAC header, and the unique IV for the wireless station.

The AP stores the modified IV in the database and reads out the pair-wise key information corresponding to the MAC address or the pair-wise key information corresponding to the unique IV of the wireless station from the database. The MAC address can be the MAC address of the wireless station or the MAC address of the AP. Preferably, the MAC address is the sending MAC address, i.e., the MAC address of the wireless station.

The AP decrypts the payload of the received frame from the wireless station with the pair-wise key corresponding to the MAC address of the AP or the pair-wise key corresponding to the unique IV of the wireless station, which are read out from the database, and processes data corresponding to the decrypted payload (S224).

Although the configuration and operation of the present invention has been described in connection with the wireless station as a sending side and the AP as a receiving side, the present invention can be applied to a case where the AP is a sending side and the wireless station is a receiving side. It is to be noted that the sending and receiving sides are not limited to the wireless station and the AP.

Furthermore, although the present invention has been described focusing on the WLAN as a wireless network, the wireless network according to the present invention is not limited to the WLAN.

As described above, with the apparatus and method for data security in a wireless network system according to the present invention, a frame, including its MAC header and payload, is encrypted with an initialization vector modified at each set state in a wireless network system, such that data that wirelessly transmitted is prevented from being exposed to unauthorized users.

While the present invention has been described with reference to exemplary embodiments thereof, it will be understood by those skilled in the art that various modifications in form and detail can be made therein without departing from the scope of the present invention as defined by the following claims.

The recited elements of the claimed apparatus, such as the modifier, encryptor, initialization vector generator, etc. while not specifically referred to in the description above, would nevertheless be understood by those skilled in the art to be included in the encryption/decryption processors and controllers discussed above.

What is claimed is:

1. An apparatus for data security in a wireless network system, comprising:
   a controller to generate a frame comprising an initialization vector upon receiving a request to transmit the frame to the wireless network, the controller modifying the initialization vector according to modification information, and the controller generating a next frame comprising the modified initialization vector upon receiving a request to transmit the next frame to the wireless network;
   an encryptor to encrypt the next frame with a non-modified initialization vector and encryption/decryption key information according to an encryption algorithm, the non-modified initialization vector being the initialization vector prior to the modification by the controller;
   a transmitter to transmit the encrypted frame to the wireless network;
   a storage unit to store the encryption/decryption key information, initialization vector information, and the modification information; and
   a decryptor to decrypt a frame received from the wireless network with the encryption/decryption key information, to determine whether the initialization vector information is provided in the decrypted frame, and when the initialization vector information is provided in the decrypted frame, to store the initialization vector information provided in the decrypted frame in the storage unit.

2. The apparatus according to claim 1, wherein the modification information comprises either information associated with a time period or information associated with a number of frames to be transmitted to the wireless network.

3. The apparatus according to claim 1, wherein the encryption/decryption key information comprises one of information associated with a group key set to be shared between one unit and at least another unit to protect the frame transmitted to the wireless network, information associated with a pair-wise key set in each unit and the at least another unit, information associated with a combination of information associated with the initialization vector that the unit generates using a random number generation function and the group key information, and information associated with a combination of the initialization vector information and the pair-wise key information set in each unit and the at least another unit.

4. The apparatus according to claim 1, wherein the controller generates an original initialization vector and the controller generates the first frame comprising the generated original initialization vector among the frames being transmitted to the wireless network upon receiving a request to transmit the first frame to the wireless network.

5. The apparatus according to claim 1, wherein the initialization vector information comprises one of information associated with the initialization vector in the first frame among the frames being transmitted to the wireless network, and information of the initialization vector that is modified according to the modification information.

6. The apparatus according to claim 4, wherein the encryptor encrypts the first frame with the encryption/decryption key information according to the encryption algorithm.

7. The apparatus according to claim 1, wherein the encryption algorithm comprises either a Wired Equivalent Privacy (WEP) algorithm or a Counter-mode CBC MAC Protocol (CCMP) algorithm.

8. The apparatus according to claim 1, wherein after storing the initialization vector information in the storage unit and after receiving another frame from the wireless network, the decryptor decrypts the another frame received from the wireless network with the encryption/decryption key information and the stored initialization vector information in the storage unit, determines whether initialization vector information different from the stored initialization vector information in the storage unit is provided in the decrypted frame, and when the initialization vector information different from the stored initialization vector information in the storage unit is provided in the decrypted frame, stores the different initialization vector information provided in the decrypted frame in the storage unit.

9. The apparatus according to claim 8, wherein the decryptor decrypts a received frame from the wireless network with the encryption/decryption key information and the different initialization vector information after storing the different initialization vector information in the storage unit.

10. An apparatus for data security in a wireless network system, comprising:
    a controller to generate a frame comprising an initialization vector upon receiving a request to transmit the frame to the wireless network, the controller modifying the initialization vector according to modification information, and the controller generating a next frame comprising the modified initialization vector upon receiving a request to transmit the next frame to the wireless network;
    an encryptor to encrypt a Medium Access Control (MAC) header portion and a payload portion of the next frame with a non-modified initialization vector and encryption/decryption key information according to an encryption algorithm, the non-modified initialization vector being the initialization vector prior to the modification by the controller;

a transmitter to transmit the encrypted frame to the wireless network; and a decryptor to selectively decrypt a MAC header portion and a payload portion of a frame received from the wireless network with the encryption/decryption key information, and to determine whether initialization vector information is provided in the decrypted frame, and when the initialization vector information is provided in the decrypted frame, to store the initialization vector information provided in the decrypted frame in a storage unit.

11. The apparatus according to claim 10, wherein the modification information comprises either information associated with a time period or information associated with a number of frames to be transmitted to the wireless network.

12. The apparatus according to claim 10, wherein the encryption/decryption key information comprises one of information associated with a group key set to be shared between one unit and at least another unit to protect the frame transmitted to the wireless network, information associated with a pair-wise key set in each unit and the at least another unit, information associated with a combination of information associated with the initialization vector that the unit generates using a random number generation function and the group key information, and information associated with a combination of the initialization vector information and the pair-wise key information set in each unit and the at least another unit.

13. The apparatus according to claim 10, wherein the controller generates an original initialization vector and the controller generates the first frame comprising the generated original initialization vector among the frames being transmitted to the wireless network upon receiving a request to transmit the first frame to the wireless network.

14. The apparatus according to claim 13, wherein the encryptor selectively encrypts a MAC header portion and a payload portion of the first frame with the encryption/decryption key information according to the encryption algorithm.

15. The apparatus according to claim 10, wherein after storing the initialization vector information in the storage unit and after receiving another frame from the wireless network, the decryptor selectively decrypts a MAC header portion and a payload portion of the another frame received from the wireless network with the encryption/decryption key information and the stored initialization vector information in the storage unit, determines whether initialization vector information different from the stored initialization vector information in the storage unit is provided in the decrypted frame, and when the initialization vector information different from the stored initialization vector information in the storage unit is provided in the decrypted frame, stores the different initialization vector information provided in the decrypted frame in the storage unit.

16. The apparatus according to claim 15, wherein the decryptor selectively decrypts a MAC header portion and a payload portion of a received frame from the wireless network with the encryption/decryption key information and the different initialization vector information after storing the different initialization vector information in the storage unit.

17. A data security method in a unit of a wireless network system, the method comprising:
generating a frame comprising an initialization vector upon receiving a request to transmit the frame to the wireless network;
modifying the initialization vector according to modification information;

generating a next frame comprising the modified initialization vector upon receiving a request to transmit the next frame to the wireless network;
encrypting the next frame with a non-modified initialization vector and encryption/decryption key information according to an encryption algorithm, the non-modified initialization vector being the initialization vector prior to the modification by the controller;
transmitting the encrypted frame to the wireless network; and
decrypting a frame received from the wireless network with the encryption/decryption key information, determining whether initialization vector information is provided in the decrypted frame, and when the initialization vector information is provided in the decrypted frame, storing the initialization vector information provided in the decrypted frame in a database.

18. The method according to claim 17, wherein the modification information comprises either information associated with a time period or information associated with a number of frames to be transmitted to the wireless network.

19. The method according to claim 17, wherein the encryption/decryption key information comprises one of information associated with a group key set to be shared between the unit and at least another unit to protect the frame transmitted to the wireless network, information associated with a pair-wise key set in each unit and the at least another unit, information associated with a combination of information associated with the initialization vector that the unit generates using a random number generation function and the group key information, and information associated with a combination of the initialization vector information and the pair-wise key information set in each unit and the at least another unit.

20. The method according to claim 17, comprising generating an original initialization vector and the controller generates the first frame comprising the generated original initialization vector among the frames being transmitted to the wireless network upon receiving a request to transmit the first frame to the wireless network.

21. The method according to claim 20, comprising encrypting the first frame with the encryption/decryption key information according to the encryption algorithm.

22. The method according to claim 17, wherein the encryption algorithm comprises either a Wired Equivalent Privacy (WEP) algorithm or a Counter-mode CBC MAC Protocol (CCMP) algorithm.

23. The method according to claim 17, further comprising:
after storing the initialization vector information in the database and after receiving another frame from the wireless network, encrypting the another frame received from the wireless with the encryption/decryption key information and the stored initialization vector information in the database; and
determining whether initialization vector information different from the stored initialization vector information in the database is provided in the decrypted frame, and when the initialization vector information different from the stored initialization vector information in the database is provided in the decrypted frame, storing the different initialization vector information provided in the decrypted frame in the database.

24. The method according to claim 23, further comprising:
decrypting a received frame from the wireless network with the encryption/decryption key information and the different initialization vector information after storing the different initialization vector information in the database.

25. A data security method in a unit of a wireless network system, the method comprising:
- generating a frame comprising an initialization vector upon receiving a request to transmit the frame to the wireless network;
- modifying the initialization vector according to modification information;
- generating a next frame comprising the modified initialization vector upon receiving a request to transmit the next frame to the wireless network;
- encrypting a Medium Access Control (MAC) header portion and a payload portion of the next frame with a non-modified initialization vector and the encryption/decryption key information according to an encryption algorithm, the non-modified initialization vector being the initialization vector prior to the modification by the controller;
- transmitting the encrypted frame to the wireless network; and
- selectively decrypting a MAC header portion and a payload portion of a frame received from the wireless network with the encryption/decryption key information, determining whether initialization vector information is provided in the decrypted frame, and when the initialization vector information is provided in the decrypted frame, storing the initialization vector information provided in the decrypted frame in the database.

26. The method according to claim 25, wherein the modification information comprises either information associated with a time period or information associated with a number of frames to be transmitted to the wireless network.

27. The method according to claim 25, wherein the encryption/decryption key information comprises one of information associated with a group key set to be shared between the unit and at least another unit to protect the frame transmitted over the wireless network, information associated with a pair-wise key set in each unit and the at least another unit, information associated with a combination of information associated with the initialization vector that the unit generates using a random number generation function and the group key information, and information associated with a combination of the initialization vector information and the pair-wise key information set in each unit and the at least another unit.

28. The method according to claim 25, comprising generating an original initialization vector and the controller generates the first frame comprising the generated original initialization vector among the frames being transmitted to the wireless network upon receiving a request to transmit the first frame to the wireless network.

29. The method according to claim 28, comprising selectively encrypting a Medium Access Control (MAC) header portion and a payload portion of the first frame with the encryption/decryption key information according to the encryption algorithm.

30. The method according to claim 25, further comprising:
- after storing the initialization vector information in the database and after receiving another frame from the wireless network, selectively decrypting a MAC header portion and a payload portion of the another frame received from the wireless network with the encryption/decryption key information and the stored initialization vector information in the database; and
- determining whether initialization vector information different from the stored initialization vector information in the database is provided in the decrypted frame, and when the initialization vector information different from the stored initialization vector information in the database is provided in the decrypted frame, storing the different initialization vector information provided in the decrypted frame in the database.

31. The method according to claim 30, further comprising:
- selectively decrypting a MAC header portion and a payload portion of a received frame from the wireless network with the encryption/decryption key information and the different initialization vector information after storing the different initialization vector information in the database.

* * * * *